United States Patent [19]  
Homma et al.

[11] Patent Number: 4,616,227  
[45] Date of Patent: Oct. 7, 1986

[54] METHOD OF RECONSTRUCTING SYNTHETIC APERTURE RADAR IMAGE

[75] Inventors: Koichi Homma; Nobuo Hamano, both of Sagamihara; Akira Maeda, Machida; Shimbu Yamagata, Kawasaki, all of Japan

[73] Assignee: Hitachi, Ltd., Tokyo, Japan

[21] Appl. No.: 630,200

[22] Filed: Jul. 12, 1984

[30] Foreign Application Priority Data

Jul. 15, 1983 [JP] Japan ............................ 58-127687

[51] Int. Cl.$^4$ ............................................. G01S 13/90
[52] U.S. Cl. ....................................... 342/25; 342/196
[58] Field of Search ............. 343/5 CM, 5 FT, 5 DP, 343/17 R, 17.2 PC

[56] References Cited  
FOREIGN PATENT DOCUMENTS 58-22982 2/1983 Japan .................................. 343/5 FT

OTHER PUBLICATIONS

Proceedings of "Earth Observation from Space and Management of Planetary Resources", pp. 421–428, by R. W. Okkes; Toulouse, France, (6–11, Mar. 1978).

Primary Examiner—Thomas H. Tarcza  
Assistant Examiner—Bernarr Earl Gregory  
Attorney, Agent, or Firm—Antonelli, Terry & Wands

[57] ABSTRACT

Azimuth compression processing is carried out by the steps of determining Doppler rate time change data a reconstructed scene from orbit data of a sattelite or aircraft, determining azimuth coordinates transformation data of an image after range compression, that is, resampling position designation data, from the Doppler rate time change data, resampling the image after range compression, in the azimuth direction using the azimuth coordinates transformation data, keeping unaltered the Doppler rate of a point image relating to the image after coordinates transformation irrespective to the position in the azimuth direction inside the scene, and thereafter using FFT.

1 Claim, 13 Drawing Figures

METHOD OF RECONSTRUCTING SYNTHETIC APERTURE RADAR IMAGE

BACKGROUND OF THE INVENTION

1. Field of the Invention

This invention relates to a method of reconstructing a high quality image in a digital processing system for reconstructing an image which can be comprehended by people from data taken by a spaceborne or airborne synthetic aperture radar (hereinafter called "SAR").

2. Description of the Prior Art

An SAR that provides an image of high spatial resolution in a microwave band through clouds has been drawing an increasing attention as a sensor for photographing the land surface in the field of remote sensing using a satellite or an airplane.

The outline of data processing of the data collected by an SAR will be first described. For detail, refer to Ando, "Synthetic Aperture Radar and Indirect Measuring Technique", Measurement and Control, Vol. 22, No. 2, for example.

In the reception images of an SAR, one point of the original image is distributed with a point spread function h(x, y), and can not be utilized as such. Here, x represents the range and y represents the azimuth. The data that is spread inside the reception images is first compressed in the range direction and then, in the azimuth direction. Range compression is effected by correlation with point pattern data for each line of the image data. If correlation is executed as such, however, an extremely prolonged processing time is necessary, so that a fast Fourier transformer (hereinafter called "FFT"), a complex multiplier, and an inverse fast Fourier transformer (hereinafter called "IFFT") are used to improve the processing time.

On the other hand, the following three standpoints have been taken in a conventional SAR image reconstruction system because the point spread function of the data in the azimuth direction on the reception image might change with the position of the point image in the azimuth direction.

The first assumes that the point spread function inside the scene to be processed is constant, and then executes the processing analogous to the range compression described above. However, this system is not free from the problem that if the change of the point image is great, the resulting output image is in focus only partially inside the scene. [Refer to J. R. Bennette, I. G. Cumming, "Digital SAR Image Formation Airborne and Sattelite Results, Proc. 13th Int. Symp. Remote Sensing of Environment, pp. 337-360 (1979)].

The second divides the scene to be processed into fine segments, and determines the point spread function for each divided image. Focusing can be obtained if the rate of division is increased, but a necessary fixed calculation quantity irrelevant to the processing size exerts adverse influences so that the calculation time becomes greater as a whole.

Unlike the range compression described above, the third system executes calculation of correlation in a real space while changing the point spread function. Though this system provides the best focal accuracy, the calculation time becomes imcomparably longer than the system using FFT. [Refer to RAE (Royal Aircraft Establishment): ESPF Study and System Implementation Manual].

Thus, the conventional SAR image reconstruction systems only leave the choice of whether the calculation speed is improved by use of FFT while neglecting the change of the point image in the azimuth direction, or precise focusing and high image quality are obtained without using FFT at the sacrifice of the calculation speed.

SUMMARY OF THE INVENTION

It is therefore an object of the present invention to provide a method of reconstructing an SAR image which eliminates the problems in the conventional high speed high focusing image reconstruction systems (using FFT) for a space variant point described above, which uses FFT and which produces high quality SAR images with precise focusing throughout a scene.

To accomplish the object described above, the present invention is characterized by including the steps of determining Doppler rate time change data in a reproduced scene from orbit data obtained by a satellite or aircraft, then determining azimuth direction coordinate conversion data of the image after range compression from the Doppler rate time change data, resampling the data in the azimuth direction after range compression from the azimuth direction coordinate conversion data, and using FFT after the Doppler rate of the point image relating to the image after coordinate conversion becomes unchangeable irrespective to the position in the azimuth direction inside the scene.

DESCRIPTION OF THE PREFERRED EMBODIMENTS

Figure 1:
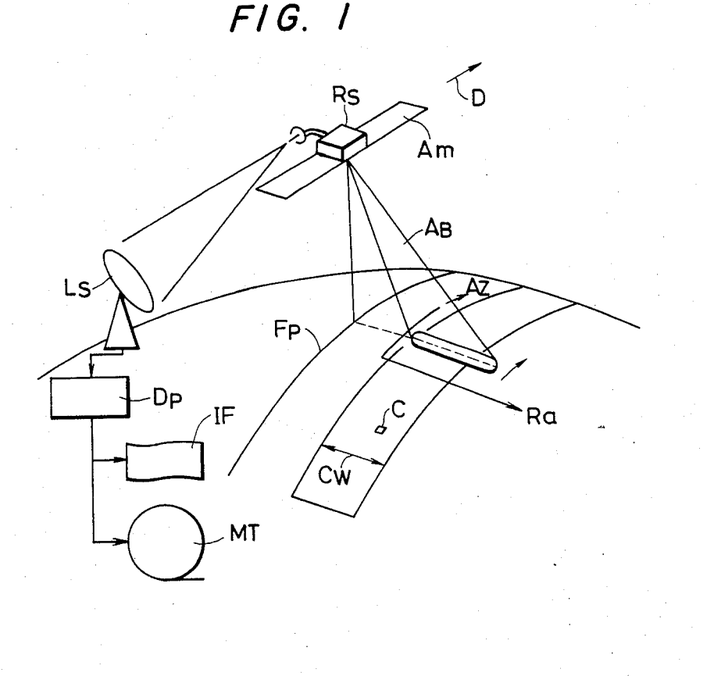
FIG. 1 is a schematic view showing the construction of a system including a satellite borne synthetic aperture radar and a satellite ground station as a whole.

FIG. 1 illustrates the overall construction of an SAR and a satellite land station. An SAR having a radar sensor Rs and an antenna Am is mounted onto a satellite or the like, and takes photographs of a land surface while moving on a flying path Fp in a direction indicated by arrows. The photograph data from the SAR are received by the land station Ls, and are processed by a data processor Dp. Preparation of a video film, IF, a data storage magnetic tape MT, and the like is then carried out. Symbol C represents a resolution cell, Ra shows the range direction of the data collected by the SAR on the land surface, Az shows the data in the azimuth direction, Ab indicates an antenna beam, and Cw indicates a swath.

Figure 2:
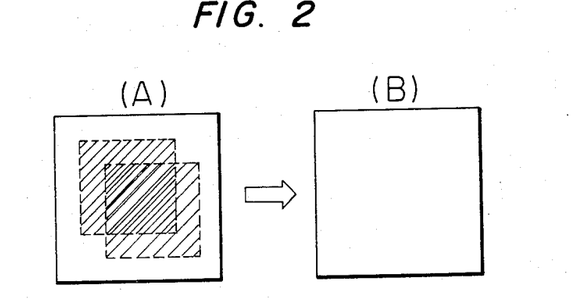
FIG. 2 is a schematic view showing the mode in which data of two points on a land surface spreading on a reception image are compressed to two points by reconstruction.

FIG. 2(A) schematically illustrates a reception image when microwave reflection points exist at only two points on the land surface. If compression is made in the two of range and azimuth directions, an original land surface pattern such as shown in FIG. 2(B) can be obtained.

Next, the principle of the present invention will be described with reference to FIG. 3.

Figure 3:
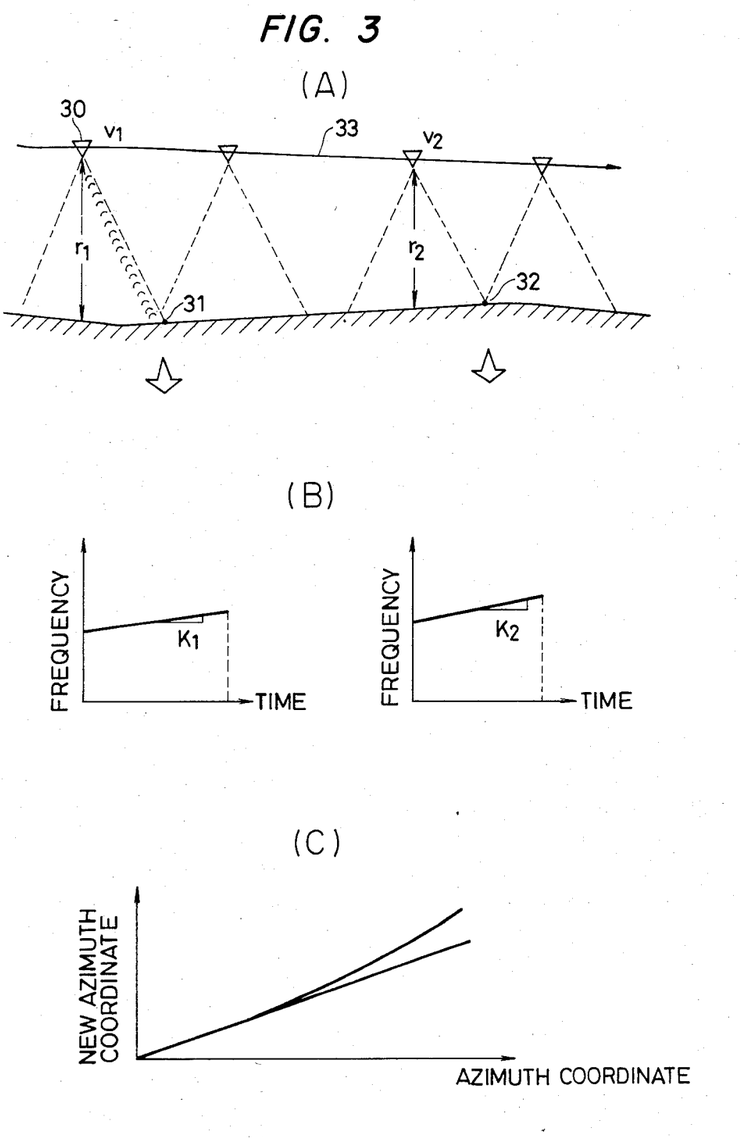
FIG. 3 is a schematic view showing the principle of the present invention.

When the satellite 30 carrying the synthetic aperture radar travels as shown in FIG. 3(A), the Doppler rate function K changes by $\Delta K$ as expressed by the following equation for the arrangement shown in FIG. 3(B) between targets on the surface 31 and 32 due to the differences of the vertical distances $r_1$ and $r_2$ with respect to the sattelite orbit 33 and of the velocities $v_1$ and $v_2$:

$$\Delta K = K_2 - K_1 = \frac{-2}{\lambda}\left(\frac{V_2^2}{r_2} - \frac{V_1^2}{r_1}\right) \tag{1}$$

where $\lambda$: wavelength of transmission microwave.

Accordingly, if azimuth compression is made in accordance with the formula of the point image while assuming a fixed Doppler change ratio $K_o$ for all the data on one line inside a scene, blurred degradation corresponding to the difference of true K and $K_o$ occurs inside a reproduced scene.

Let's assume that an image coordinate system is locally expanded and diminished (linear coordinate transformation), and that the relation $y=ky'$ is fulfiled with y and y' representing the coordinate system of the orignal image and that of the transformed image, respectively. Assuming also that the phase $\phi(y)$ of the point image relating to the original image coordinate system is expressed by the following equation, $$\phi(y) = \frac{K}{2} y^2 + by \tag{2}$$

then, the phase $\tilde{\phi}(y)$ of the point image on the coordinates system after transformation is expressed by the following equation:

$$\tilde{\phi}(y) = \phi(ky') = \frac{K}{2} k^2 y'^2 + kby' \tag{3}$$

Accordingly, the Doppler rate function K changes to $k^2K$ in local linear coordinate transformation of $y=ky'$.

Therefore, in order to make the true Doppler rate function $K(y)$, that changes with the coordinates (y), a fixed Doppler rate function Ko, the coordinate transformation $y'=y'(y)$ described above must fulfil the following differential equation:

$$\left(\frac{dy'}{dy}\right)^2 K_o = K(y) \tag{4}$$

If the variation in scene of the Doppler rate function K(y) is linear, that is, if $K(y)=K+\Delta K \cdot y$, the following relation must be fulfiled:

$$y' = \frac{2K}{3\Delta K}\left(\sqrt{1 + \frac{\Delta K}{K} y}\right)^3 \tag{5}$$

The shape of this coordinate transformation formula is illustrated in FIG. 3(C).

Since the principle of the invention has thus been explained, the embodiments thereof will now be described with reference to FIG. 4.

Raw data of a synthetic aperture radar stored in a magnetic tape unit 5 is range-compressed by a known range compressor 6, corner-turned by an image disc 10 and thereafter subjected to coordinate transformation or resampling by the later-appearing resampler 11. In the range compressor 6, the data inside the magnetic tape unit 5 is subjected to Fourier conversion by FFT 7, and are multiplied by a fixed range reference function by a complex multiplier 8. The data is then subjected to inverse Fourier conversion by IFFT 9 to provide the data after range compression.

Figure 6:
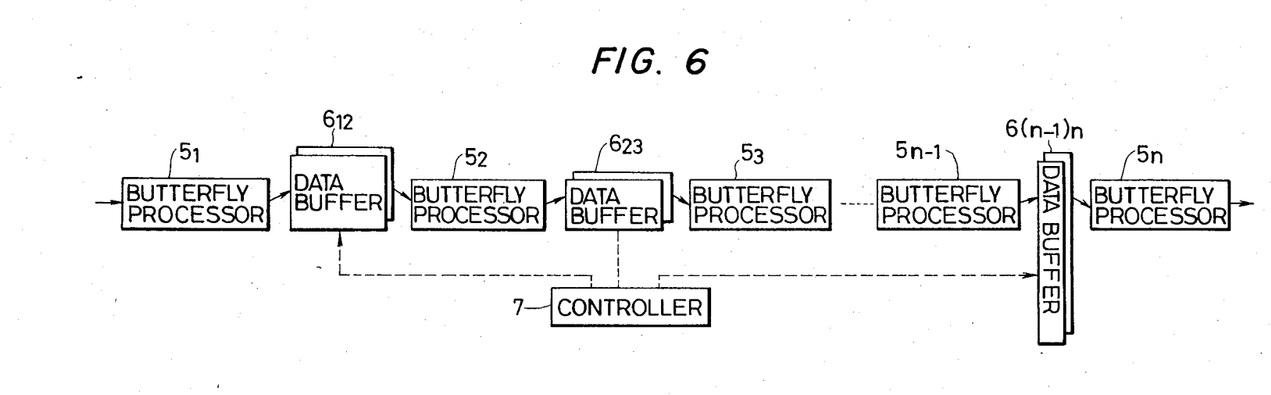
FIG. 6 is a block diagram showing an example of FFT.

FIG. 6 illustrates an example of FFT 9. This transformer 9 processes $2^n$, 1-line data in a pipeline arrangement using n-stage butterfly processors $5_1, 5_2, \ldots, 5_n$. Data buffers $6_{12}, 6_{23}, \ldots, 6_{(n-1)n}$ are interposed between these processors. The input data that is required by the processor $5_2$ of the second stage for the first butterfly calculation lies across both first and second calculation results by the processor $5_1$ of the first stage, so that the data buffer $6_{12}$ must have a capacity of four data. However, if the butterfly calculation of the four data is completed, it is no longer necessary to input thereafter the data, so that there is no problem even if the content of the data buffer $6_{12}$ is destroyed in the next butterfly calculation result of the processor $5_1$. After all, the content of the data buffer $6_{12}$ may be for the four data. Likewise, the content of the data buffer $6_{23}$ is for eight data, and the content of the buffer $6_{(n-1)n}$ of the final stage is for $2^n$ data.

Each of the buffers is an alternating buffer which can read and write simultaneously, so that all the calculators can operate simultaneously without any rest. Write and read addresses of the alternating buffers are controlled in synchronism by a controller 7.

Figure 7:
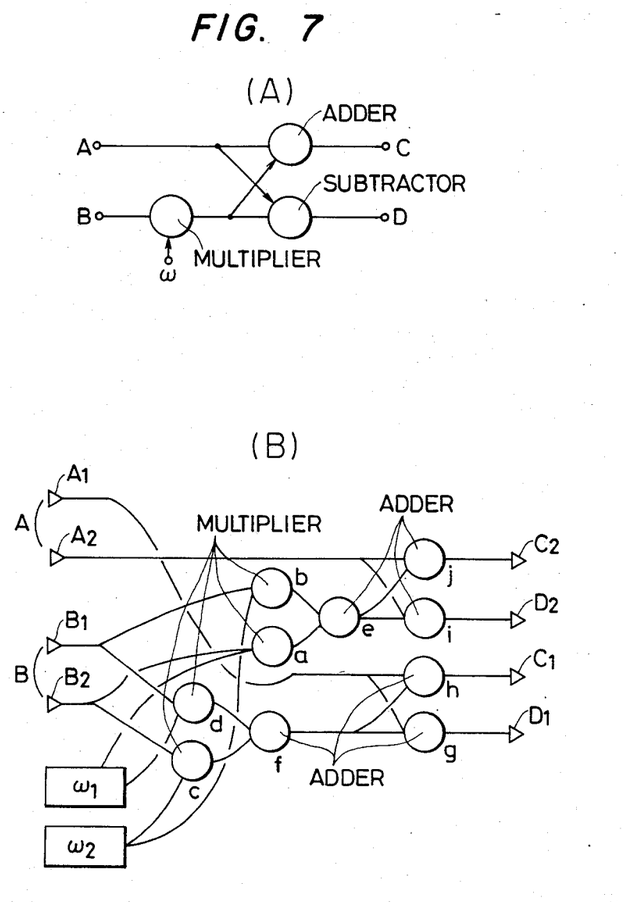
FIG. 7 is a diagram showing the construction of a complex processor.

The content of processing by each processor is to calculate two complex data A, B and a complex coefficient $\omega$ as shown in FIG. 7(A). FIG. 7(B) illustrates more definitely the content of processing. The processing from a to j shown in FIG. 7(B), that is, four real multiplications (a–d) and six real additions (e–j), is executed to provide two complex data C and D (with their real parts being called $C_1$ and $D_1$ and their imaginary parts, $C_2$ and $D_2$, respectively), where $A_1$ and $B_1$ represent the real parts of the two complex data A and B, $A_2$ and $B_2$ represent their imaginary parts, the real part of the complex coefficient $\omega$ is represented by $\omega_1$ and its imaginary part, by $\omega_2$, respectively.

Figure 8:
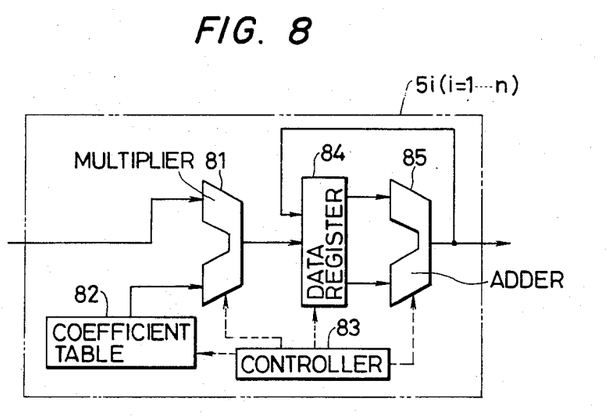
FIG. 8 is a diagram showing the construction of a calculator as the original form of a complex multiplier.

An example of the processors $5_1$ through $5_n$ is shown in FIG. 8. Four real data that are sequentially applied are sequentially multiplied by coefficients of a coefficient table 82 by a multiplier 81 and are then added (including subtraction) to one another by an adder 85. A data register 84 is interposed between the multiplier 81 and the adder 85 and is used as an intermediate buffer for the result of addition. The operation and address of each device described above are controlled by a controller 83.

Figure 4:
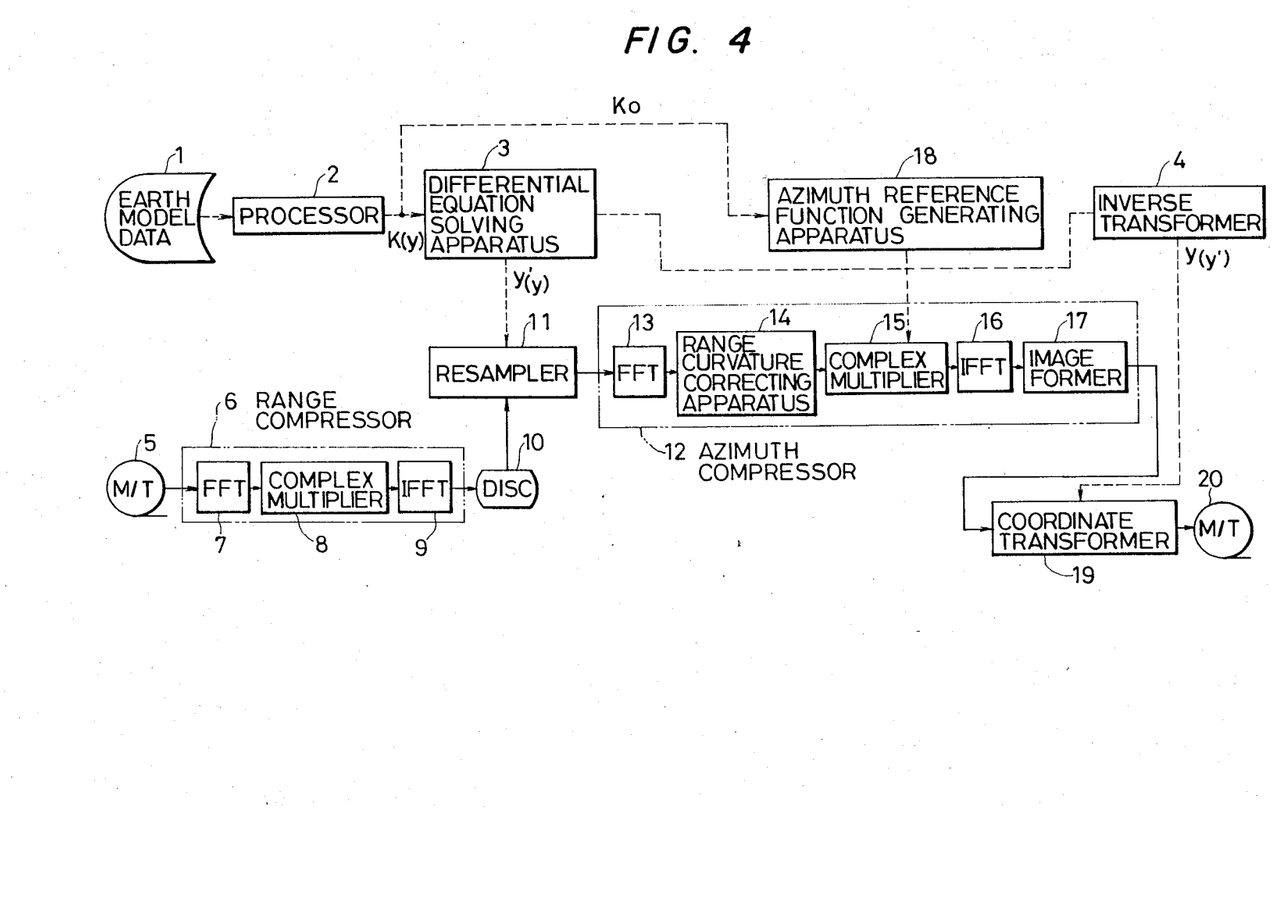
FIG. 4 is a block diagram showing an example of a satellite land station in accordance with the present invention.
Figure 9:
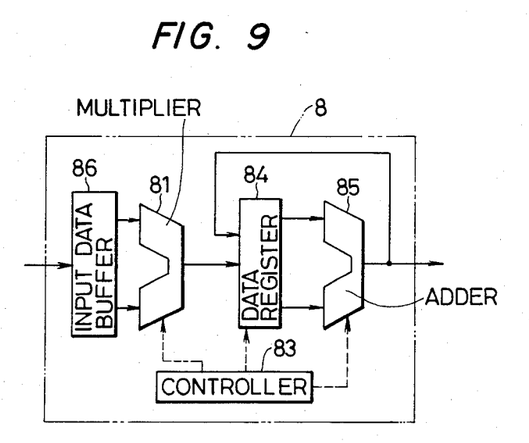
FIG. 9 is a diagram showing the construction of the complex multiplier.

The complex multiplier 8 shown in FIG. 4 can be realized by removing the coefficient table 82 from the processor shown in FIG. 8 and adding an input data buffer 86 to the processor, providing a processor shown in FIG. 9. For, the product between the complex data can be obtained by multiplication and addition subsequent to the former.

Figure 5:
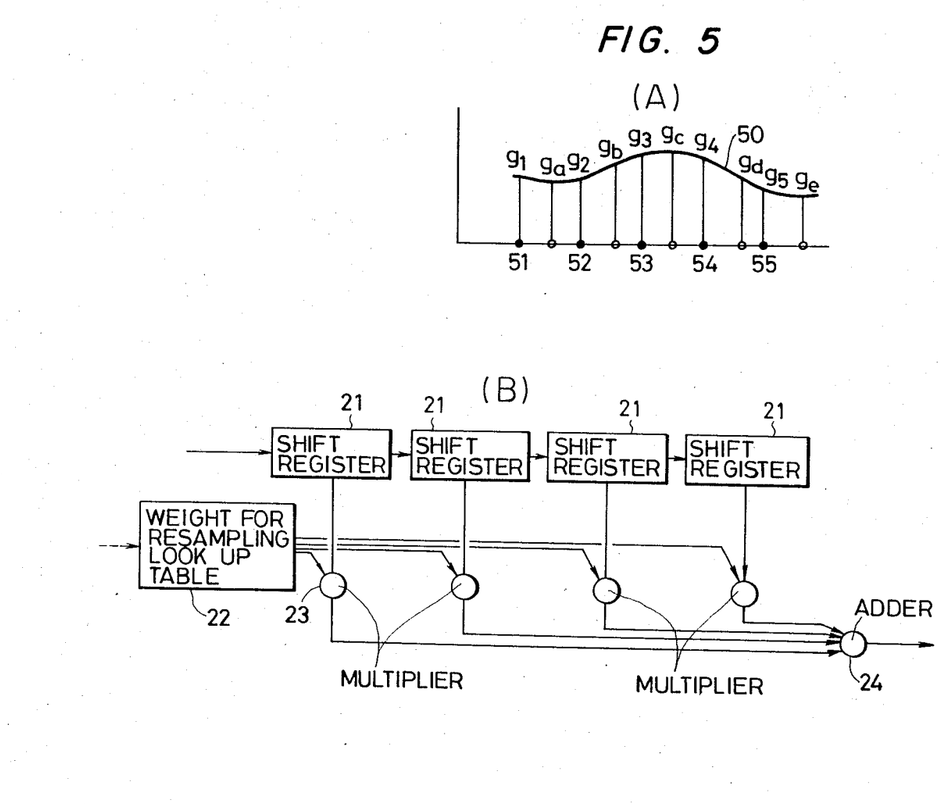
FIG. 5 is a diagram showing the block construction of a data resampler necessary for image coordinate conversion.

In the processor 2 shown in FIG. 4, the Doppler rate function K(y) in the scene is determined from the sattelite orbit-earth model data 1 in accordance with equation (1), and its output is applied to the differential equation solving apparatus 3 capable of solving equation (4) so as to apply coordinate transformation data y'(y), that is, the resampling data 11, to the resampler 11. The range compressed data after coordinate transformation is subjected to azimuth compression by a known azimuth compressor 12, and the Doppler rate function of the dot spread function used in this case is the constant $K_o$ of equation (4). The resampler 11 for the coordinate transformation of the image data in the azimuth direction can be realized by using the shift register 21, the multiplier 23, the adder 24 and weights for resampling look-up table 22, as shown in FIG. 5(A).

Data resampling for the coordinate transformation of the digital image data will now be explained with reference to FIG. 5(A). If the values of 1-line of the image data from the disc 10 described earlier are assumed to be {... $g_a$, $g_b$, ... }, data resampling is to obtain the values {... $g_1$, $g_2$, ... } at the data positions {... 51, 52, ... } after coordinate transformation on an interpolation curve 50 from adjacent data. In the embodiment shown in FIG. 5(B), the values are obtained by the weighting sum of the adjacent data at four points. Since weighting is determined depending upon the resampling position, however, it is advisable to obtain it in advance and to employ a table look-up system which looks up the table 22 on the basis of the resampling position {... 51, 52 .. . } which is determined by the coordinate transformation equation.

The known azimuth compressor 12 consists of FFT 13, the range curvature corrector 14, the complex multiplier 15, IFFT 16, an image former 17 and an azimuth reference function generator 18. The range curvature corrector 14 corrects the curvature of the point image after range compression on the scene due to the change of the difference between the sattelite and the land surface, and executes coordinate transformation resampling in the range direction.

Its result is multiplied by the azimuth reference function generated by the azimuth reference function generator 18 by the complex multiplier 15, and is then subjected to IFFT by IFFT 16, providing the result of azimuth compression. The image former 17 converts the complex data to integral data. The reproduced output of the azimuth compressor 12 is transformed to the coordinate system equivalent to that of the original image.

The range curvature corrector 14 is the same as the data resampler 11 shown in FIG. 5(B), and the image former 17 is an apparatus for calculating the norm of a complex number and can be realized by the same apparatus as the complex multiplier 8 shown in FIG. 9.

After azimuth compression, the data is inversely transformed by a coordinate transformer 19 and is applied as output to a magnetic tape unit 20. The coordinate transformer 19 is equivalent to the apparatus 11 but is different from the latter in that it receives the inverse transformation data y(y') from the inverse transformer 4.

When reconstructing a synthetic aperture radar image, the present invention first determines a point spread function change data inside a scene due to the speed of a sattelite or an aircraft and the change of its height with time, then keeps the point spread function unaltered on the scene after transformation by the coordinate transformation of the original image, and as a result, accomplishes the high speed processing by use of fast Fourier transformation and provides high quality images with precise focusing throughout the scene.

What is claimed is:

1. In an image reconstruction system for reconstructing an image from data collected by a synthetic aperture radar carried by a flying object, a method of reconstructing a synthetic aperture radar image comprising: a first step of determining Doppler rate time change data as a space variant component in the azimuth direction from the orbit data of said flying object and from earth model data, a second step of determining coordinate transformation data of the image after range compression from said Doppler rate time change data so that said Doppler rate after said transformation is fixed; a third step of performing geometric transformation by resampling the pixel value of the image after range compression using said coordinate transformation data; a fourth step of executing compression processing of the image after said geometric transformation, in the azimuth direction using fast Fourier transformation; a fifth step of determining coordinate inverse transformation data by inverse geometric transformation of the image after azimuth compression to a coordinate system equivalent to that of an original image; and a sixth step of reconstructing the image by resampling the pixel value of the iamge after azimuth compression, using said inverse transformation data.

* * * * *